(12) United States Patent
Delcheva et al.

(10) Patent No.: US 11,182,203 B2
(45) Date of Patent: Nov. 23, 2021

(54) SYSTEMS AND METHODS TO ORCHESTRATE INFRASTRUCTURE INSTALLATION OF A HYBRID SYSTEM

(71) Applicant: VMware, Inc., Palo Alto, CA (US)

(72) Inventors: Anna Delcheva, Sofia (BG); Dimitar Hristov Barfonchovski, Sofia (BG); Evgeny Aronov, Sofia (BG); Dimitar Ivanov, Sofia (BG); Miroslav Mitevski, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 726 days.

(21) Appl. No.: 15/370,477

(22) Filed: Dec. 6, 2016

(65) Prior Publication Data
US 2018/0159721 A1   Jun. 7, 2018

(51) Int. Cl.
| | |
|---|---|
| *G06F 9/48* | (2006.01) |
| *H04L 29/08* | (2006.01) |
| *G06F 9/455* | (2018.01) |
| *G06F 8/65* | (2018.01) |
| *G06F 9/50* | (2006.01) |
| *G06F 8/61* | (2018.01) |

(52) U.S. Cl.
CPC ............ *G06F 9/4881* (2013.01); *G06F 8/61* (2013.01); *G06F 8/65* (2013.01); *G06F 9/45558* (2013.01); *G06F 9/5055* (2013.01); *H04L 67/10* (2013.01); *H04L 67/34* (2013.01); *G06F 2009/4557* (2013.01); *G06F 2009/45595* (2013.01)

(58) Field of Classification Search
CPC ...... G06F 9/4881; G06F 8/61; G06F 9/45558; H04L 67/10

USPC ........................................................ 709/202
See application file for complete search history.

(56) References Cited

U.S. PATENT DOCUMENTS

| | | |
|---|---|---|
| 8,739,257 B1 | 5/2014 | Robinson |
| 9,092,248 B1 | 7/2015 | Makin et al. |
| 9,152,446 B2 | 10/2015 | Ansel |
| 9,386,079 B2 | 7/2016 | Ramalingam et al. |

(Continued)

OTHER PUBLICATIONS

United States Patent and Trademark Office, "Non-Final Office action," issued in connection with U.S. Appl. No. 15/370,677 dated Aug. 27, 2018, 14 pages.

(Continued)

*Primary Examiner* — Vivek Srivastava
*Assistant Examiner* — Hien V Doan
(74) *Attorney, Agent, or Firm* — Hanley, Flight & Zimmerman, LLC

(57) ABSTRACT

Methods and apparatus to orchestrate infrastructure installation of a hybrid system are disclosed. An example apparatus includes a first virtual appliance including a management endpoint. The first virtual appliance is to organize tasks to be executed to install a computing infrastructure. The example apparatus includes a first component server to execute tasks. The component server includes a management agent to communicate with the management endpoint to receive a task to be executed to install the computing infrastructure. The first virtual appliance is to associate a role with the first component server and to determine whether the first component server satisfies a prerequisite associated with the role. The first virtual appliance is to facilitate addressing an error when the first component server is determined not to satisfy the prerequisite.

20 Claims, 10 Drawing Sheets

(56) References Cited

U.S. PATENT DOCUMENTS

| | | |
|---|---|---|
| 9,471,474 B2 | 10/2016 | Gurumurthy et al. |
| 9,773,122 B2 | 9/2017 | Betzler et al. |
| 2007/0174658 A1* | 7/2007 | Takamoto ............ G06F 11/2028 714/4.11 |
| 2008/0134176 A1 | 6/2008 | Fitzgerald et al. |
| 2010/0293409 A1 | 11/2010 | Machida |
| 2011/0154320 A1 | 6/2011 | Verma |
| 2011/0173605 A1 | 7/2011 | Bourne |
| 2012/0054486 A1 | 3/2012 | Lakkavalli et al. |
| 2012/0117381 A1 | 5/2012 | Lo et al. |
| 2012/0233299 A1 | 9/2012 | Attanasio et al. |
| 2013/0018994 A1 | 1/2013 | Flavel et al. |
| 2013/0232497 A1* | 9/2013 | Jalagam .................... G06F 8/61 718/104 |
| 2013/0247136 A1 | 9/2013 | Chieu et al. |
| 2013/0297964 A1 | 11/2013 | Hegdal et al. |
| 2014/0208111 A1 | 7/2014 | Brandwine et al. |
| 2015/0052402 A1 | 2/2015 | Gurumurthy et al. |
| 2015/0074743 A1 | 3/2015 | Ilieva et al. |
| 2015/0150111 A1 | 5/2015 | Friedmann et al. |
| 2015/0180653 A1 | 6/2015 | Nix |
| 2015/0215308 A1 | 7/2015 | Manolov et al. |
| 2015/0222604 A1 | 8/2015 | Ylonen |
| 2015/0312116 A1 | 10/2015 | Taheri et al. |
| 2015/0324182 A1 | 11/2015 | Barros et al. |
| 2015/0339113 A1 | 11/2015 | Dorman et al. |
| 2015/0347264 A1* | 12/2015 | Mohammed ........ G06F 11/3476 714/45 |
| 2015/0358392 A1 | 12/2015 | Ramalingam et al. |
| 2016/0142409 A1 | 5/2016 | Frei et al. |
| 2016/0285832 A1 | 9/2016 | Petrov et al. |
| 2017/0222981 A1 | 8/2017 | Srivastav et al. |
| 2018/0157550 A1 | 6/2018 | Ivanov et al. |
| 2018/0159844 A1 | 6/2018 | Barfonchovski et al. |
| 2018/0159845 A1 | 6/2018 | Aronov et al. |

OTHER PUBLICATIONS

United States Patent and Trademark Office, "Non-Final Office action," issued in connection with U.S. Appl. No. 15/370,569, dated Sep. 7, 2018, 21 pages.

United States Patent and Trademark Office, "Non-Final Office action," issued in connection with U.S. Appl. No. 15/370,626, dated Aug. 27, 2018, 55 pages.

United States Patent and Trademark Office, "Final Office action," issued in connection with U.S. Appl. No. 15/370,626, dated Jan. 4, 2019, 35 pages.

United States Patent and Trademark Office, "Notice of Allowance," issued in connection with U.S. Appl. No. 15/370,677, dated Feb. 14, 2019, 23 pages.

United States Patent and Trademark Office, "Advisory Action," issued in connection with U.S. Appl. No. 15/370,626, dated Jan. 17, 2020, 12 pages.

United States Patent and Trademark Office, "Final Office action" issued in connection with U.S. Appl. No. 15/370,626, dated Nov. 7, 2019, 42 pages.

United States Patent and Trademark Office,"Non-Final Office action," issued in connection with U.S. Appl. No. 15/370,626, filed Jun. 26, 2020, 41 pages.

United States Patent and Trademark Office,"Non-Final Office action," issued in connection with U.S. Appl. No. 16/413,155, filed Aug. 7, 2020, 25 pages.

\* cited by examiner

SYSTEMS AND METHODS TO ORCHESTRATE INFRASTRUCTURE INSTALLATION OF A HYBRID SYSTEM

FIELD OF THE DISCLOSURE

The present disclosure relates generally to cloud computing and, more particularly, to methods and apparatus to orchestrate infrastructure installation of a hybrid system in a distributed environment such as a cloud computing environment.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
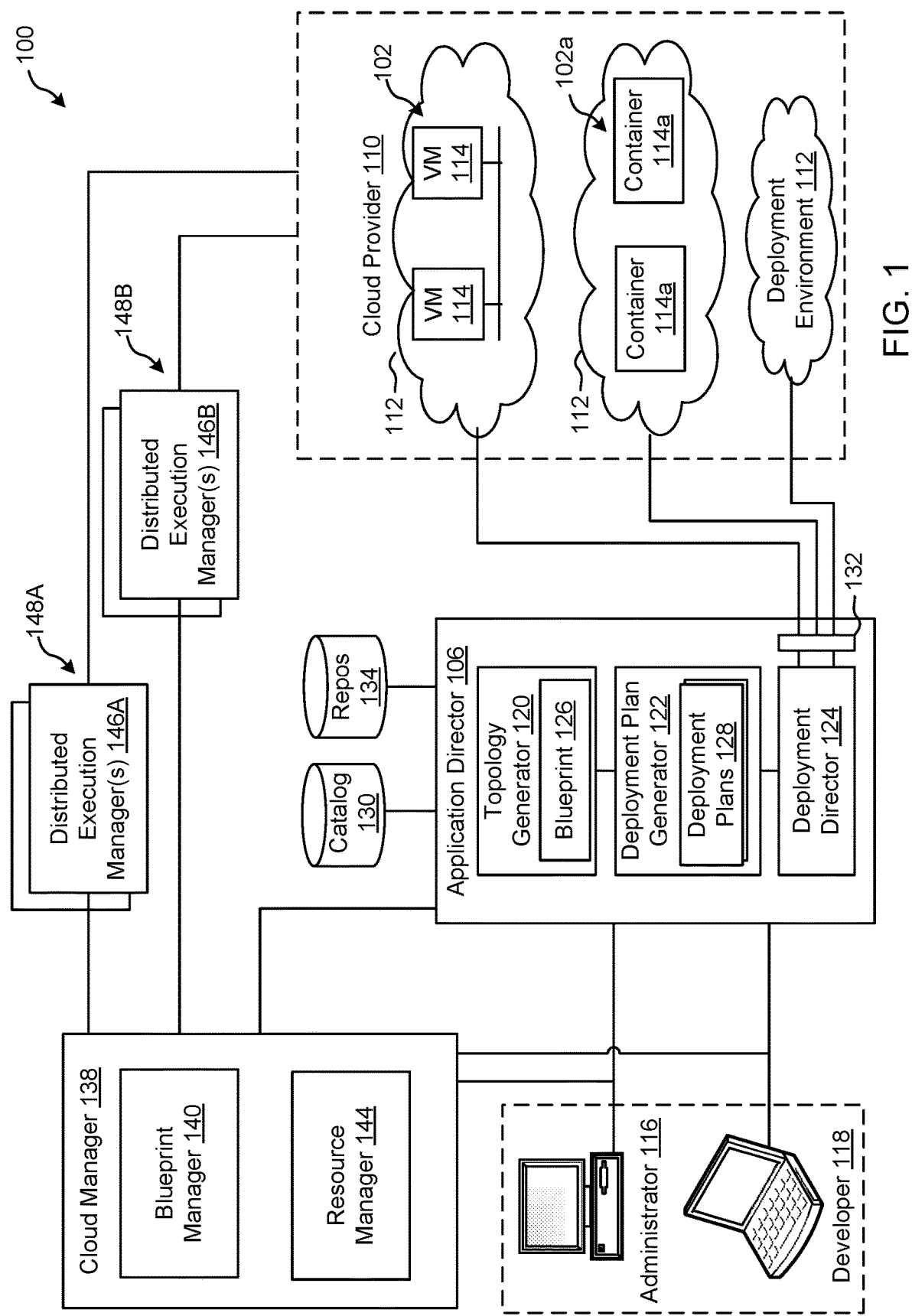
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
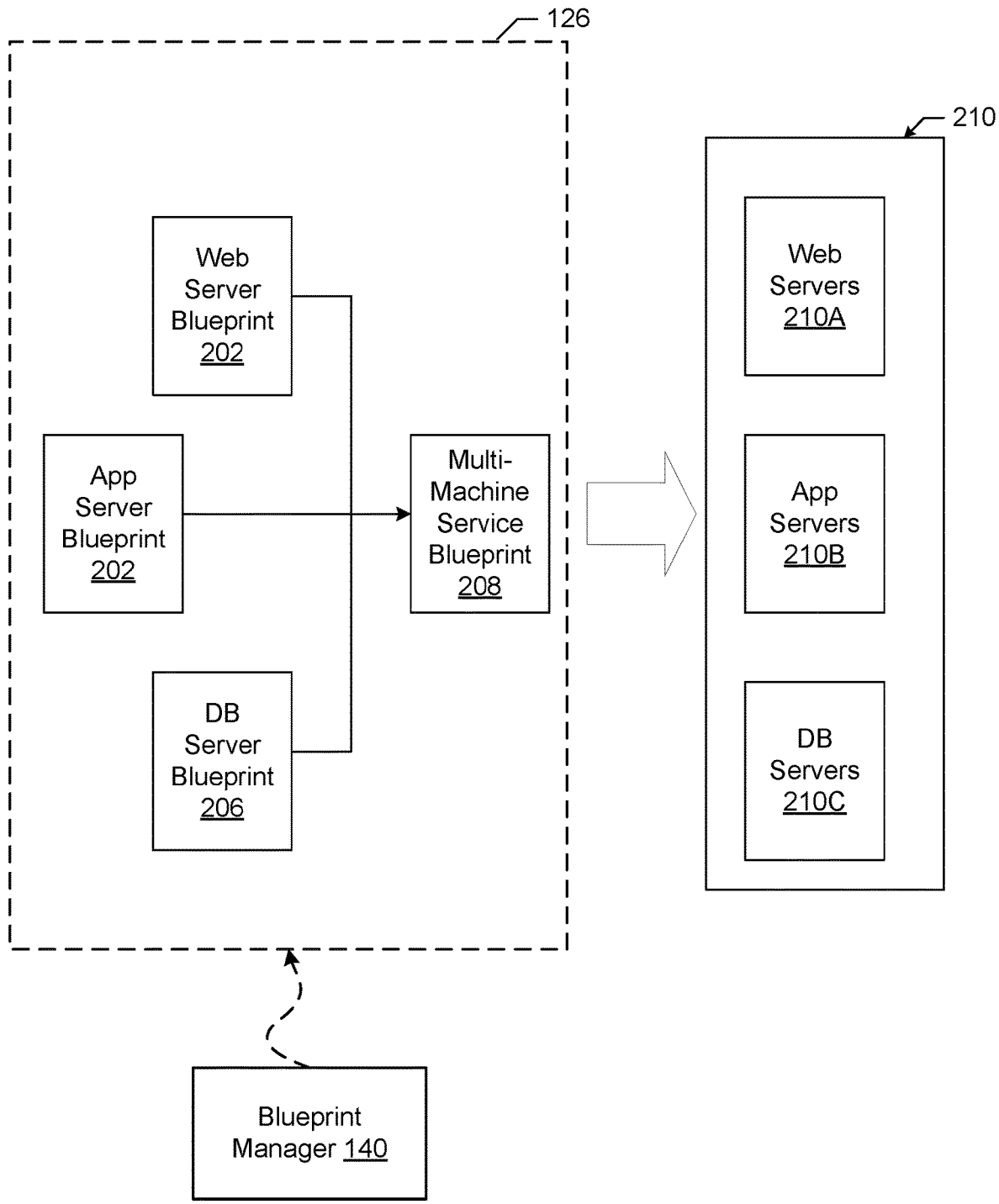
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
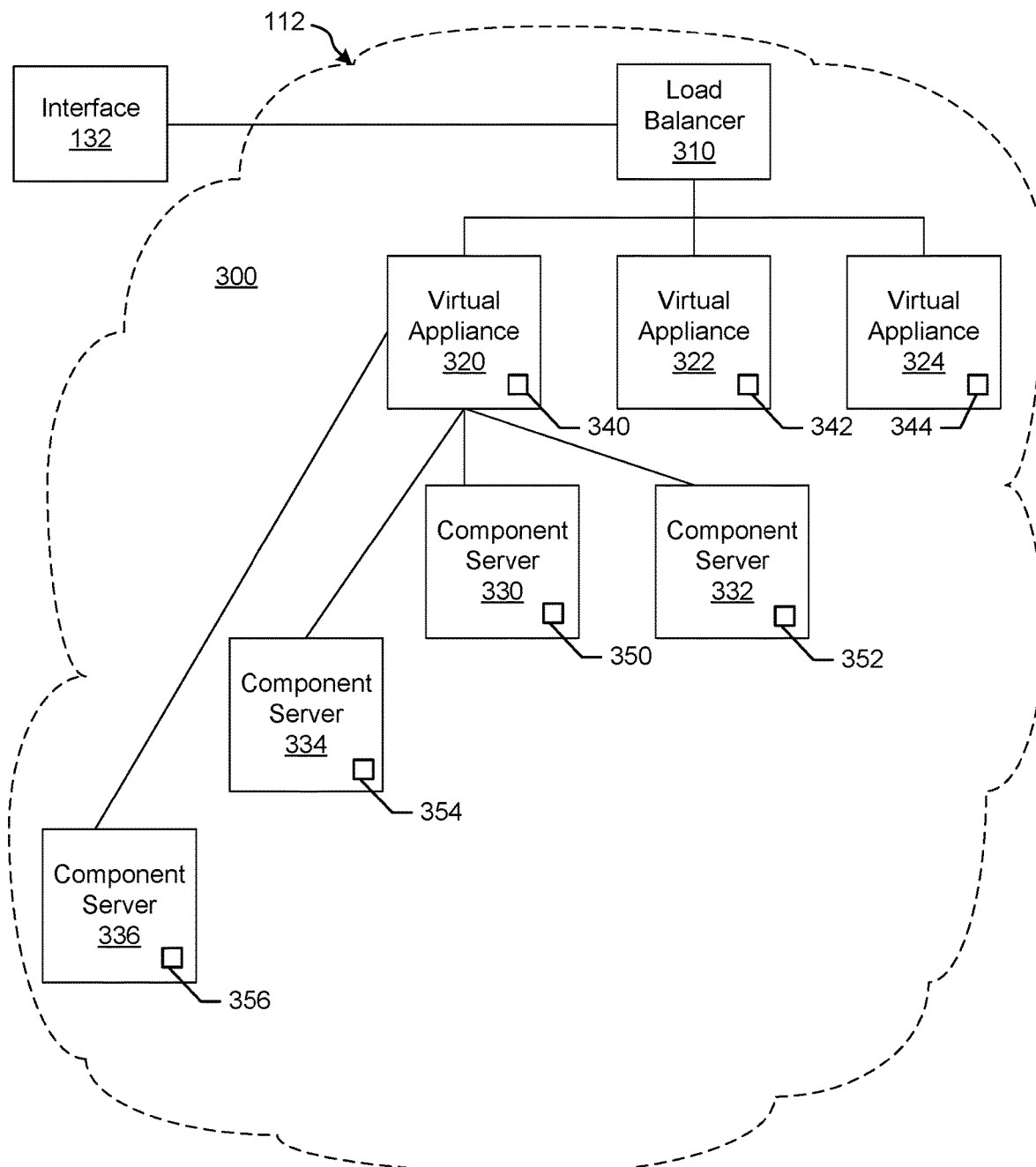
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than or in addition to directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, management endpoints 340, 342, 344 share a data store, and any management agent 350-356 can connect to any management endpoint 340, 342, 344 to retrieve a task and/or associated data from the data store. Thus, management endpoints 340, 342, 344 are interconnected via the data store. In certain examples, a management endpoint 340-342 doubles as an agent 350-356, allowing the endpoint 340-344 on a vA 320-324 to automate a task on another vA 320-324. Additionally, in certain examples, each agent 350-356 maintains a pool of available endpoints 340-344. If an endpoint 340-344 becomes unresponsive, the agent 350-356 can automatically switch to a different endpoint 340-344, from which the agent 350-356 can retrieve execution tasks. Agents 350-356 connected via different endpoints 340-344 can initiate task execution from a plurality of vAs 320-324, even if not currently connected to that vA 320-324 because, due to the connection between endpoints 340-344, for example.

In certain examples, the management agents 350-356 synchronize component servers 330-336 with the vA 320-324 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336. In certain examples, component servers 330-336 can be installed and/or managed even when the vA 320-324 and/or its endpoint 340-344 are physically restricted from accessing the server 330-336 and/or its agent 350-356. The agent 350-356 polls the endpoint 340-344 for work items, so an inbound connection to the component server 330-336 can be absent, for example.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
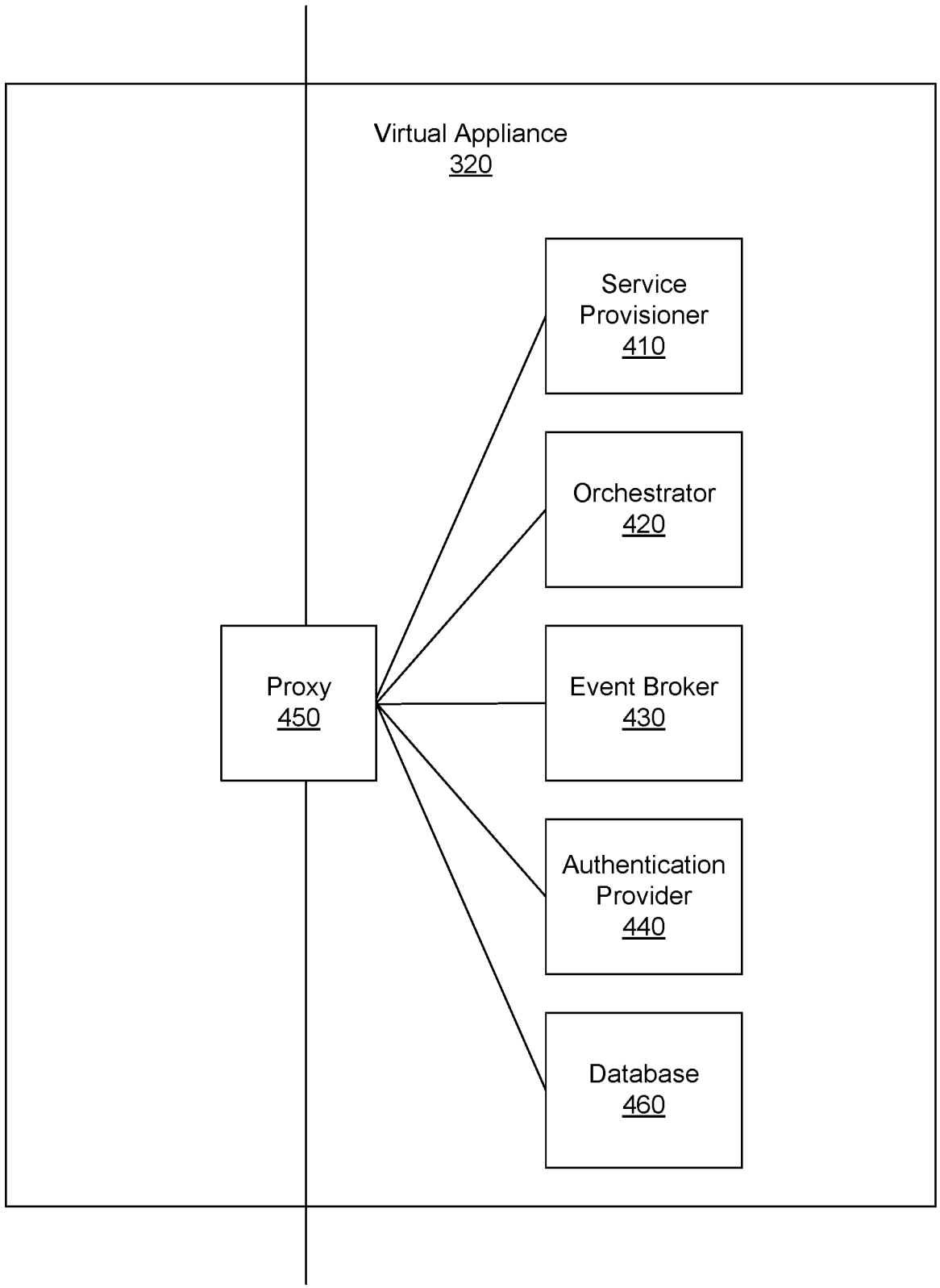
FIG. 4 illustrates an example implementation of a virtual appliance.

FIG. 4 illustrates an example implementation of the vA 320. In the example of FIG. 4, the vA 320 includes a service provisioner 410, an orchestrator 420, an event broker 430, an authentication provider 440, an internal reverse proxy 450, and a database 460. The components 410, 420, 430, 440, 450, 460 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Example Infrastructure Installation

In certain examples, a cloud computing (e.g., vCAC™, vRA™, etc.) deployment includes one or more vAs 320-324 and one or more component servers 330-336 (e.g., Microsoft Windows™ machines, etc.) on which are installed components (e.g., software such as Web services, application services, database services, etc.) that form the IaaS portion of the product. In a distributed and/or high availability deployment, a plurality of component servers 330-336 form the installed product, and having to install the IaaS components manually on all of the component servers 330-336 is a time-consuming process, involving, among other things, multiple context switches and many opportunities for user misconfiguration of the deployed system. For example, manual installation involves installing components on an appliance, downloading an installer, and then visit each server to install the components manually using the installer. However, if a component is deployed out of order, the installation may not function. Additionally, data entry is required for each manual installation, and mis-typing of the manual data entry can invalidate the entire installation. Further, such a mistake may not be realized until the erroneous installation is deployed, resulting in lost time, money, errors, and inoperable systems. Simplification and automation of this process reduces the time needed and errors involved in setting up a new instance of the cloud computing system.

In certain examples, rather than requiring customers to manually install an IaaS component on each server 330-336, installation can be executed on each node from a centralized location via the management agent 350-356 installed on each component server 330-336. The agent 350-356 is installed and registered with the vA 320. After registration, communication with the vA 320 is authenticated using a client certificate and signed token(s). The vA's 320 root credentials are not persisted on the server 330-336. Each instance of the management agent 350-356 has a node identifier (ID), which uniquely identifies the agent 330-336 in a cluster of machines 330-336 forming the cloud deployment. After registration, the agent 330-336 starts polling the vA 320 in a configurable time interval to obtain commands to be executed. The commands are executed by the corresponding server 330-336, and a result is reported back to the vA 320 by the agent 350-356 and can be used for further processing, for example.

In certain examples, installation of a hybrid system including a plurality of appliances 320-324 and component servers 330-336 having a plurality of roles can be orchestrated via the management agents 350-356. Using the management agents 350-356 in communication with the management endpoints 340-344 at their respective vAs 320-324, the example installation 300 can be coordinated without manual user action throughout phases of the installation.

Figure 5:
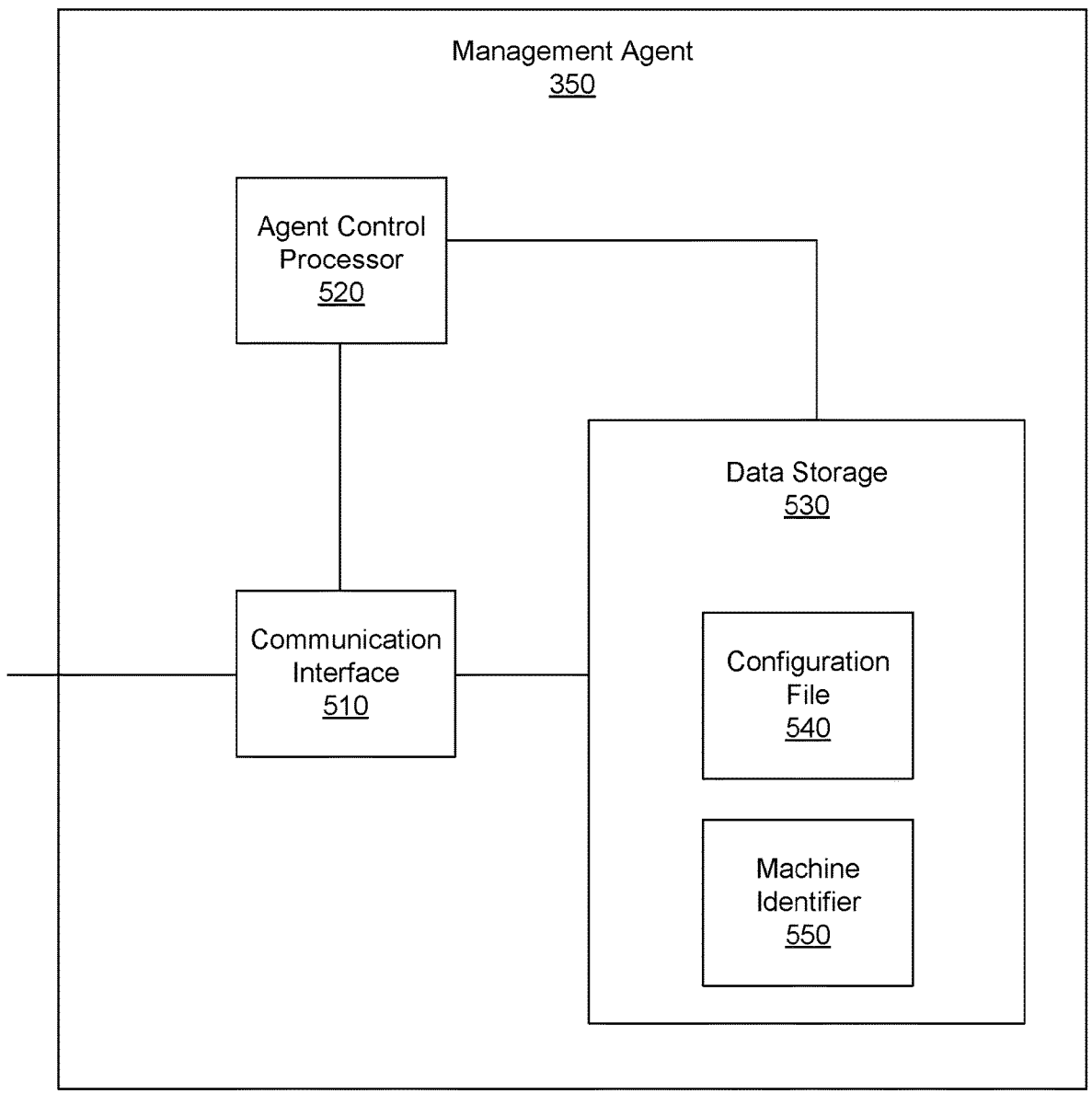
FIG. 5 illustrates a block diagram of an example implementation of a management agent.

FIG. 5 illustrates a block diagram of an example implementation of the management agent 350 (and/or 352, 354, 356). As shown in the example of FIG. 5, the management agent 350 includes a communication interface 510 through which the agent 350 can communicate with the endpoint 340 (and/or 342, 344) of the vA 320 (and/or 322, 324). The communication interface 510 is a hardware and/or software interface allowing the agent 350 to exchange data, commands, etc., with the endpoint 340 and/or other communication node, for example.

The example agent 350 also includes an agent control processor 520. The agent control processor 520 executes instructions to control the agent 350 for command and/or other application execution, communication, storage, etc. The instructions can be transmitted to the agent control processor 520 via the communication interface 510 and/or via a data storage 530, for example.

The example data storage 530 includes a configuration file 540 and a machine identifier 550. The example configuration file 540 can include information such as credentials to authenticate and/or validate the agent 350 to the vA 320, etc. Credentials can include a certificate (e.g., with a public key and private key for authentication, etc.), a unique identifier, etc. The example agent control processor 520 can process instructions, generate communications, etc. The example data storage 530 can also include instructions (e.g., computer program code, etc.) to be executed by the agent control processor 520.

Figure 6:
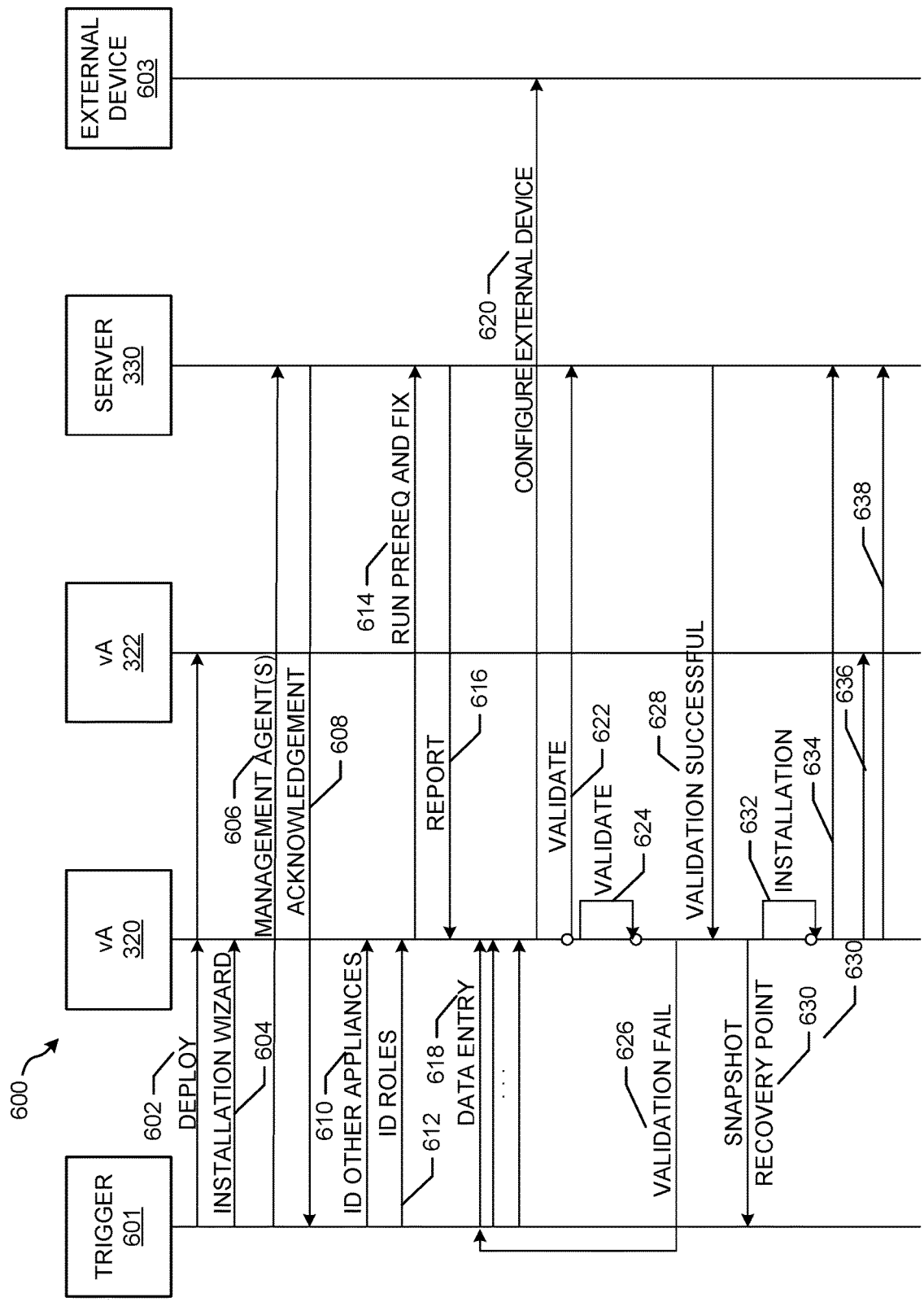
FIG. 6 illustrates an example data flow diagram showing an exchange of information between an appliance and a component server for installation.

FIG. 6 illustrates an example data flow diagram showing an exchange of information 600 between the vA 320, 322 and the component server 330 to install system 300 components including the vA 320, 322 and component server 330 including management agent 350. At 602, a trigger 601 (e.g., a user via a vA management webpage, an automated script, etc.) initiates deployment of the vA 320, 322. At 604, an installation wizard is also triggered 601 to be run by the vA 320, for example.

At 606, a management agent 350 (and/or 352-356) is installed on each component server 330 (and/or 332-336). At 608, each server 330 (and/or 332-336) acknowledges the installation of the management agent 350 (and/or 352-356). The acknowledgement can include an authentication of management agent 350 credentials by the vA 320, for example. Authentication and/or authorization can include an exchange and verification of a certificate, identifier, etc., associated with the management agent 350 and/or its associated server 330 by the vA 320, for example.

For example, a cloud-based installation may include one or more vAs 320-324 and one or more servers 330-336 (e.g., "Windows™ machines", etc.) on which a plurality of components (e.g., five, six, seven, ten, etc.) are installed (e.g., applications, database, management, etc.) to form an IaaS in a distributed, high availability environment. The management agents 350-356 communicate with the management endpoint(s) 340-344 to receive commands, execute commands, install software, upgrade an installation at the server 330-336, etc.

Each management agent 350-356 has a node identifier (ID) that uniquely identifies the agent 350-356 in a cluster of machines 330-336 forming the system 300. When installing the agent 350-356, an address and root credentials of the primary vA 320 are entered so that the agent 350-356 can register itself in the vA 320. After the registration, communication with the vA 320 is authenticated using a client certificate and signed token(s). In certain examples, since the certificate is used for communication between the agent 350-356 and the endpoint 340, the root credentials of the vA 320 are not persisted on the machines 330-336.

At 610, other appliances (e.g., other vAs 324, etc.) are identified to the vA 320. For example, the primary vA 320 is informed of other appliances (e.g., vA 322, 324, etc.) to be included in the configuration. At 612, a role is provided for each server 330 (and/or 332-336). For example, the server 330 is assigned a role as a database server. Alternatively, the server 330 is assigned a role as a Web server. The server 330 may be assigned a role as an application server, for example. The server 330 may be assigned a role as a Windows™ server, for example.

Each role is associated with one or more rules that guide and/or establish criteria for the associated role. Each rule can be associated with one or more prerequisites for a server 330-336 to execute the rule and perform the role. In a high availability (HA) environment, rules may specify that there are at least two servers 330-336 for each role to provide redundancy and increased availability if one server 330 of a given role is busy or otherwise unavailable, for example.

At 614, the vA 320 evaluates or checks applicable rule prerequisite(s) for a given role to ensure the associated server 330 can perform the role. The vA 320 attempts to fix or otherwise remedy any error(s) identified in its evaluation of the server 330. For example, prerequisites can include a determination of whether the load balancer 310, vA 320-324, and/or component server 330-336, etc., is/are reachable, and an associated fix can include an address look-up and resolution. Another prerequisite can include registration of the server 330-336 and/or other IaaS node with the vA 320-324, and an associated fix can include registration of the server 330-336 and/or other IaaS node with the vA 320-324, such as described above, for example. Another fix of a server 330-336 error can include downloading and installing a service pack on the server 330-336, for example. Another prerequisite can include database (e.g., object-relational database such as Postgres, etc.) access, and an associated fix can include access and log in to the database, for example.

At 616, the server 330 reports back to the vA 320 with an indication of what cannot be automatically fixed. For example, the server 330 generates a report of what prerequisite errors were fixed and what prerequisite errors were identified and not fixed, and sends 616 the report to the vA 320.

At 618, errors that were identified but not fixed in the prerequisite checks are handled based on data entry at the vA 320. For example, via the trigger 601, the user can provide data entry and/or one or more automated scripts can be executed to provide answer(s), setting(s), address(es), password(s), credential(s), etc., to satisfy missing prerequisite information for the server 330 at the vA 320. In certain examples, the data entry 618 can be guided by a wizard for component address(es), username(s), identity of service(s) to be executed, identification of port(s) (e.g., default or custom), database credentials/address, etc. In certain examples, a user provides data entry which is recorded and converted into a script for subsequent automated execution, for example.

At 620, once data entry is complete, the vA 320 asks to configure the load balancer (LB) 310 with an external device/system 603. Thus, the LB 310 can be configured with information regarding connected components 320-324, 330-336, etc., and their capabilities and ability to distribute workload for a plurality of tasks. Using data and the management agent(s) 350-356, rules and/or other prerequisites are sent to server(s) 330-336 along with other instructions to configure a particular customer environment.

At 622, the vA 320 validates the server(s) 330-336, and, at 624, the vA 320 validates itself. For example, at 622, the vA 320 sends one or more commands to the server 330 based on the role of the server 330 (e.g., install web service (validate=true), install manager service, etc.) to validate the installation and/or other configuration of the server 330. The server 330 returns an indication of whether or not the validation is okay (e.g., has been completed successfully, etc.). At 626, if the validation failed, repeated data entry 618 can be used to adjust network settings and/or other change in data to then repeat validation at 622, for example. At 628, if validation is successful, then the installation, configuration, and validation process is complete.

At 630, a snapshot of the installation is obtained. The snapshot forms a recovery point. The snapshot stores the configuration for later use, restoration, error recovery, etc. At 632, the installation is executed. First, at 632, the installation is executed at the vA 320 (e.g., the primary appliance). Then, at 634, the installation occurs at the server 330 (e.g., via the management agent 350). At 636, the installation occurs at the vA 322 (e.g., a secondary appliance). Thus, a sequence of commands is built and targeted for an environment including server(s) 330. The commands are triggered for orchestration of services via the management agent(s) 350. The central or primary vA 320 does not have access to individual nodes but instead can be accessed by the management agent(s) 350-356 of the respective server(s) 330-336, which acts to execute installation instructions from the vA 320. The vA 320 awaits acknowledgement from the agent(s) 350-356.

Figure 7:
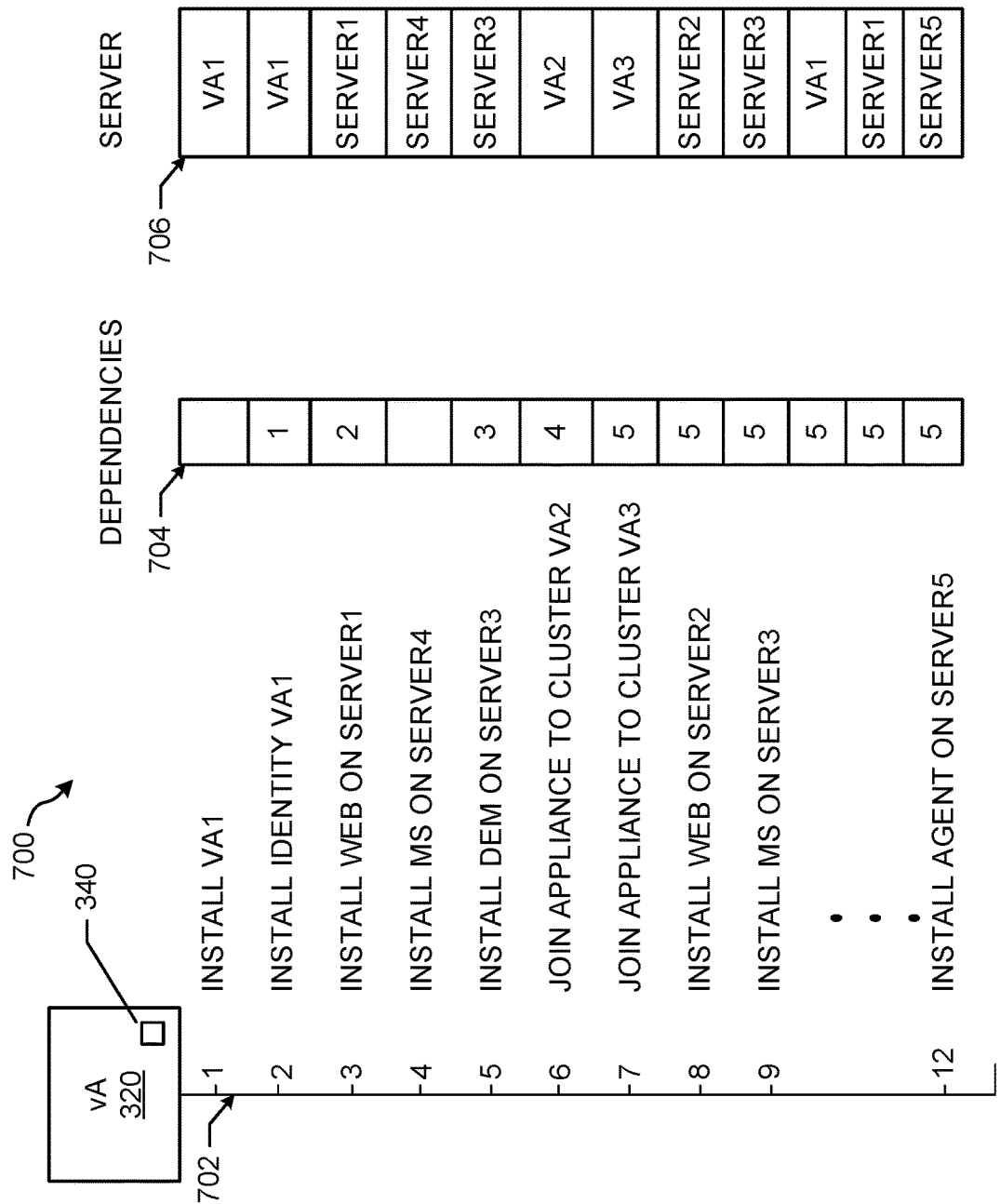
FIG. 7 illustrates an example schedule of components for installation in an example system.

FIG. 7 illustrates an example schedule of components 700 for installation in an example system. The example vA 320 includes information for installation 632-638 of multiple components after prerequisite checks, validation, and snapshot generation 602-630, as described above with respect to FIG. 6. As illustrated in the example of FIG. 7, vA 320, referred to in the example as the primary or main appliance vA1, interacts with a plurality of servers 330-336, referred to in the example as server1, server2, server3, server4, and servers. The vA 320 also interacts with a plurality of secondary appliances 322-324, referred to in the example as vA2 and vA3.

As illustrated in the example of FIG. 7, the vA1 320 has a queue of commands 702 (e.g., install commands, joinder commands, etc.) established via its management endpoint 340. The commands 702 (e.g., install vA1, install identity vA1, install web component on server1 (e.g., primary Windows™ server), install manager service component on server4, install DEM on server3, etc., then join appliance to cluster vA2, join appliance to cluster vA3, etc., then install web on server2, install manager service on server3, etc., install management agent on servers, etc.) are executed by the vA1, alone or in conjunction with one or more servers 330-336 and/or external device(s), for example.

Some or all of the commands 702 have certain dependency 704 on other command(s) 702. That is, one command 702 may depend on nothing, but another command 702 may depend on a prior command 702. Thus, while some commands can be executed in parallel and/or otherwise asynchronously, other commands must be executed serially and/or otherwise synchronously when their dependency 704 has been satisfied, for example.

The vA1 320 builds and then deploys the installation including copies of involved components. Each component server 330-336 polls the vA1 320 for work. The endpoint 340 of the vA 320 examines the queue 702 to determine a next task. If the next task has no dependency 704, the endpoint 350 transmits the task to the server 330-336 via its agent 350-356 for execution. If the task in the queue 702 has a dependency 704, then the endpoint 340 determines whether the dependent task has been completed, started, or not yet started, for example. If the dependent task has not yet started, for example, then the endpoint 340 will not pass the associated task from the queue 702 to the server 330-336.

Each task in the queue 702 is also associated with and/or otherwise intended for a server 706. For example, server1 queries the vA1 to determine whether the queue 702 includes any task for server1. The endpoint 340 of the appliance vA1 determines that yes, task 3 in the queue 702 is for server1 (e.g., installation of web server on server1, etc.). However, task 3 depends on the execution of task 2 by the vA1, and task 2 depends on the execution of task 1 by the vA1. The endpoint vA1 does not release task 3 to the agent of server1 until the vA1 has executed tasks 1 and 2. Task 4 however, has no dependency 704, so the endpoint can release task 4 to the agent of server4 when the agent polls for its task. Additionally, in the example of FIG. 7, once task execution reaches task 7, all remaining tasks depend on task 5, which has then been completed. Thus, tasks 7-12 can be dispensed and/or otherwise released to be executed in parallel by their respective component.

In certain examples, the vA 320 publishes the commands 702 to available servers 330-336 (e.g., via communication between the endpoint 340 and agents 350-356) and is aware of the sequence 702 and dependency 704 of the commands. The servers 330-336, however, accept and execute the commands without knowledge of the sequence 702 and dependency 704. For example, when a server 330-336 is instructed to install a component, the server's agent 350-356 facilitates a download of an installer from the vA 320, which the server 330-336 extracts and executes to install the component. Thus, the vA 320 is aware of the servers 330-336 available to execute tasks but does not instruct the servers 330-36 to execute tasks. Rather, the servers 330-336 poll the queue of instructions 702, and the vA 320 checks whether dependencies 704 have been met to release the task to be performed by the server 330-336 and/or other component.

While example implementations of the example cloud computing system 100 and virtual machine installation 300 are illustrated in FIGS. 1-7, one or more of the elements, processes and/or devices illustrated in FIGS. 1-7 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 may include one or more elements, processes and/or devices in addition to, or instead of, those illustrated in FIGS. 1-7, and/or may include more than one of any or all of the illustrated elements, processes and devices.

Figure 8:
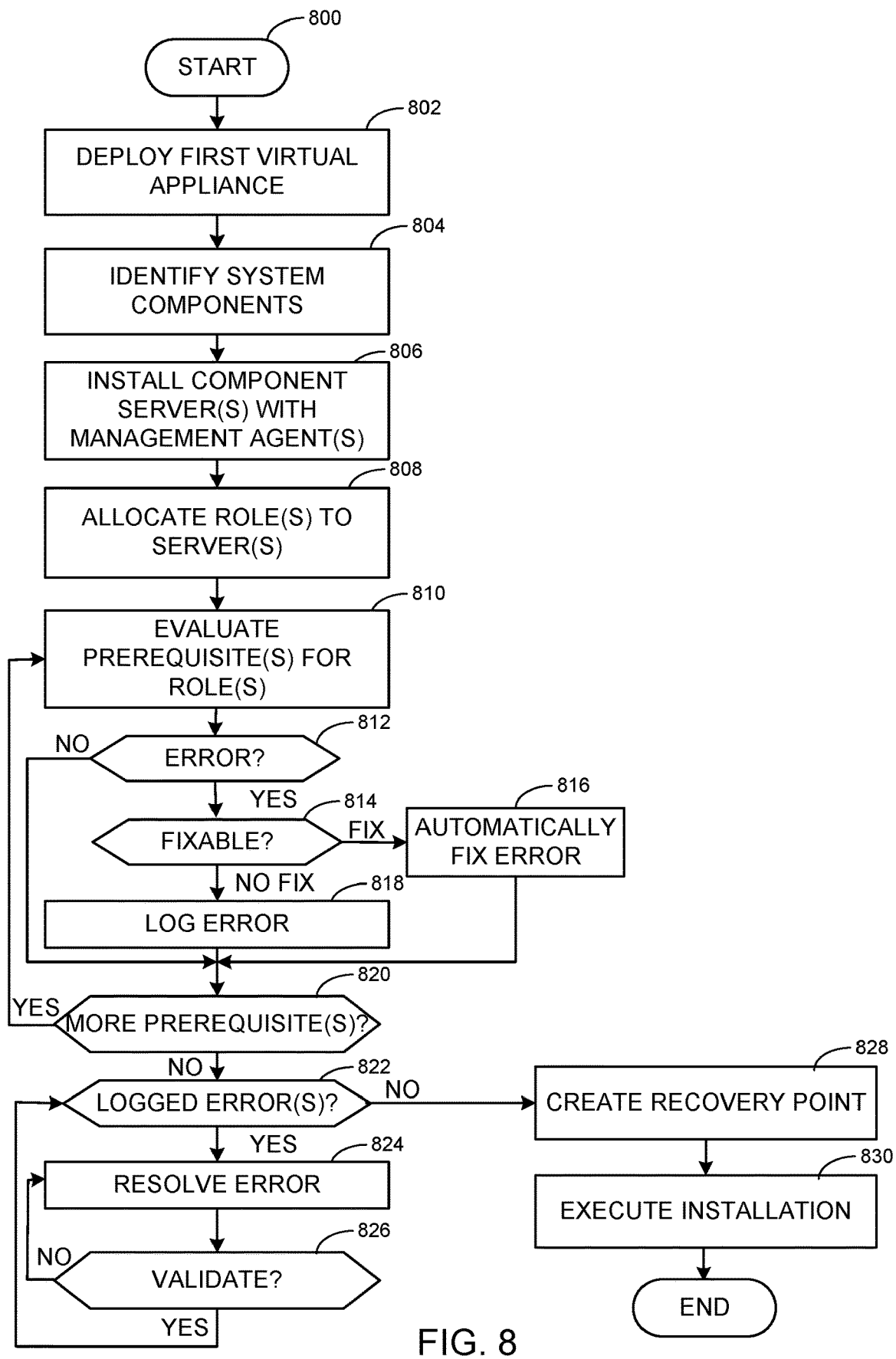
FIGS. 8-9 depict a flowcharts representative of computer readable instructions that may be executed to implement example infrastructure installation.
Figure 9:
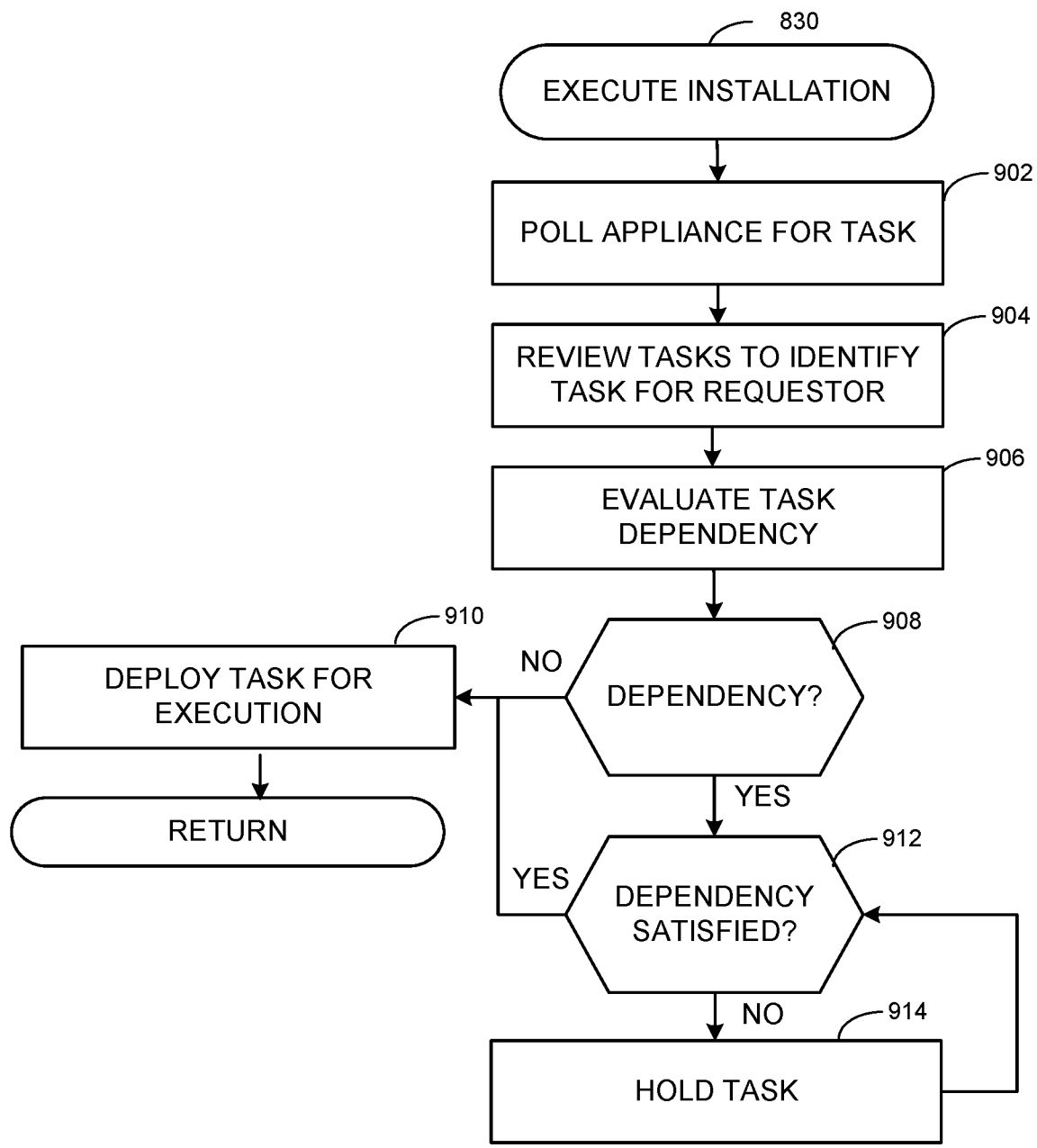

Flowcharts representative of example machine readable instructions that may be executed to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 are shown in FIGS. 8-9. In these examples, the machine readable instructions implement programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 8-9, many other methods of deploying, managing, and updating workload domains in accordance with the teachings of this disclosure may alternatively be used. For example, the order of execution of the blocks may be changed, and/or some of the blocks described may be changed, eliminated, or combined.

As mentioned above, the example processes of FIGS. 8-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 8-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 8 depicts a flowchart representative of computer readable instructions that may be executed to implement the example infrastructure installation 300. An example program 800 is illustrated in FIG. 8. Initially, at block 802, the first, primary, or main vA 320 is deployed (e.g., triggered by a user, an automated script, an event, etc.). The installation wizard is also triggered to be run by the vA 320, for example.

At block 804, components in the system 300 are identified. For example, a cloud-based installation may include one or more vAs 320-324 and one or more servers 330-336 (e.g., "Windows™ machines", etc.) on which a plurality of components (e.g., five, six, seven, ten, etc.) are installed (e.g., applications, database, management, etc.) to form an IaaS in a distributed, high availability environment. The management agents 350-356 communicate with the management endpoint(s) 340-344 to receive commands, execute commands, install software, upgrade an installation at the server 330-336, etc. The system 300 can also include one or more devices such as a load balancer 310, etc.

At block 806, the management agent 350-356 is installed on each component server 330-336. Each server 330-336 acknowledges the installation of the management agent 350-356. The acknowledgement can include an authentication of management agent 350 credentials by the vA 320, for example. Authentication and/or authorization can include an exchange and verification of a certificate, identifier, etc., associated with the management agent 350 and/or its associated server 330 by the vA 320, for example.

In certain examples, each management agent 350-356 has a node identifier (ID) that uniquely identifies the agent 350-356 in a cluster of machines 330-336 forming the system 300. When installing the agent 350-356, an address and root credentials of the primary vA 320 are entered so that the agent 350-356 can register itself in the vA 320. After the registration, communication with the vA 320 is authenticated using a self-signed certificate. In certain examples, since the self-signed certificate is used for communication between the agent 350-356 and the endpoint 340, the root credentials of the vA 320 are not persisted on the machines 330-336.

At block 808, a role is provided for each server 330 (and/or 332-336). For example, the server 330 is assigned a role as a database server. Alternatively, the server 330 is assigned a role as a Web server. The server 330 may be assigned a role as an application server, for example. The server 330 may be assigned a role as a Windows™ server, for example.

Each role is associated with one or more rules that guide and/or establish criteria for the associated role. Each rule can be associated with one or more prerequisites for a server 330-336 to execute the rule and perform the role. In a high availability (HA) environment, rules may specify that there are at least two servers 330-336 for each role to provide redundancy and increased availability if one server 330 of a given role is busy or otherwise unavailable, for example.

At block 810, the vA 320 evaluates or checks applicable prerequisite(s) for a given role to ensure the associated server 330 can perform the role. For example, prerequisites can include a) a determination of whether the load balancer 310, vA 320-324, and/or component server 330-336, etc., is/are reachable; b) registration of the server 330-336 and/or other IaaS node with the vA 320-324; c) presence of a minimum software and/or firmware version; d) database (e.g., object-relational database such as Postgres, etc.) access; etc.

At block 812, an error is identified in the prerequisite evaluation. For example, a prerequisite may not be satisfied and may need to be addressed before installation can continue. If no error is identified, then control advances to block 820 to evaluate whether prerequisites remain to be evaluated. If an error is identified, then, at block 814, the error is evaluated to determine whether or not the error is automatically fixable by the vA 320 and/or other connected component. If the error is fixable, then, at block 816, the vA 320 automatically fixes the error. If the error is not automatically fixable, then, at block 818, the error is logged (e.g., included in a report, etc.).

At block 820, prerequisite(s) are evaluated for the role to determine whether or not additional prerequisite(s) remain to be evaluated. If prerequisite(s) remain to be evaluated, the control reverts to block 810 to evaluate the prerequisite(s) for the role(s).

If all prerequisite(s) have been evaluated, then, at block 822, the error log is reviewed to identify errors logged during prerequisite analysis. If no error has been logged, then, at block 828, a recovery point (e.g., a snapshot) is created for the system 300 configuration. However, if one or more errors are identified, then, at block 824, error resolution is attempted. For example, data entry can be provided via a user and/or one or more automated scripts to provide answer(s), setting(s), address(es), password(s), credential(s), etc., to satisfy missing prerequisite information for the server 330 at the vA 320. In certain examples, the data entry 618 can be guided by a wizard for component address(es), username(s), identity of service(s) to be executed, identification of port(s) (e.g., default or custom), database credentials/address, etc. In certain examples, a user provides data entry which is recorded and converted into a script for subsequent automated execution, for example.

At block 826, the vA 320 validates the server(s) 330-336 and itself. For example, the vA 320 sends one or more commands to the server 330 based on the role of the server 330 (e.g., install web service (validate=true), install manager service, etc.) to validate the installation and/or other configuration of the server 330. The server 330 returns an indication of whether or not the validation is okay (e.g., has been completed successfully, etc.). At block 826, if the validation failed, repeated data entry at block 824 can be used to adjust network settings and/or other change in data to then repeat validation at block 826, for example. If validation is successful, then the installation, configuration, and validation process is complete after the process has been conducted for each logged error (block 822).

After all logged errors have been evaluated, at block 828, recovery point is created. The recovery point can be formed from a snapshot taken of the installation, for example. The snapshot stores the configuration for later use, restoration, error recovery, etc. At block 830, the installation is executed. For example, the installation is executed at the vA 320 (e.g., the primary appliance). Then, the installation occurs at the server 330 (e.g., via the management agent 350). The installation also occurs at the vA 322 (e.g., a secondary appliance). Thus, a sequence of commands is built and targeted for particular server(s) 330. The commands are triggered for orchestration of services via the management agent(s) 350. The central or primary vA 320 does not have access to individual nodes but instead accesses the management agent(s) 350-356 of the respective server(s) 330-336, which acts to execute installation instructions from the vA 320. The vA 320 awaits acknowledgement from the agent(s) 350-356.

FIG. 9 illustrates an example implementation of executing the installation at block 830 of the example flow diagram of FIG. 8. At block 902, the server 330-336 polls the vA 320 for a task to be executed (e.g., via communication between the management agent 350-356 and the management endpoint 340, etc.). At block 904, the vA 320 reviews its queue of tasks 702 to be executed (e.g., install commands, joinder commands, etc.) established via the management endpoint 340 to identify a task 702 for the requesting server 330-336.

At block 906, an identified task is evaluated to identify a dependency. That is, some or all of the tasks 702 have a dependency 704 on other task(s) 702. That is, one task 702 may depend on nothing, but another task 702 may depend on a prior task 702. Thus, while some tasks 702 can be executed in parallel and/or otherwise asynchronously, other tasks 702 are to be executed serially and/or otherwise synchronously when their dependency 704 has been satisfied, for example.

At block 908, presence or absence of a dependency 704 for the task 702 is examined. If no dependency 704 exists, then, at block 910, the task 702 is deployed by the vA 320 for execution by the server 330-336.

At block 912, if a dependency exists, then the dependency 704 is evaluated to determine whether or not the dependency has been met. If the dependency 704 has been satisfied, then, at block 910, the task 702 is deployed by the vA 320 for execution by the server 330-336. However, if the dependency 704 has not been met, then, at block 914, the vA 320 does not release the task 702 to the server 330-336 until the dependency 704 has been satisfied.

For example, the server 330-336 queries the vA 320 to determine whether the queue 702 includes any task for the server 330-336. The endpoint 340 of the vA 320 determines that a task in the queue 702 is for the server 330-336. However, the task 702 depends on the execution of another task. The endpoint 340 of the vA 320 does not release the task 702 to the agent 350-356 of the server 330-36 until the vA 320 has executed the dependent task. If no dependencies are identified or the dependent task has already executed, however, the endpoint 340 can release the task to the agent 350-356 of the server 330-336 when the agent 350-356 polls the endpoint 340 for its task 702.

Figure 10:
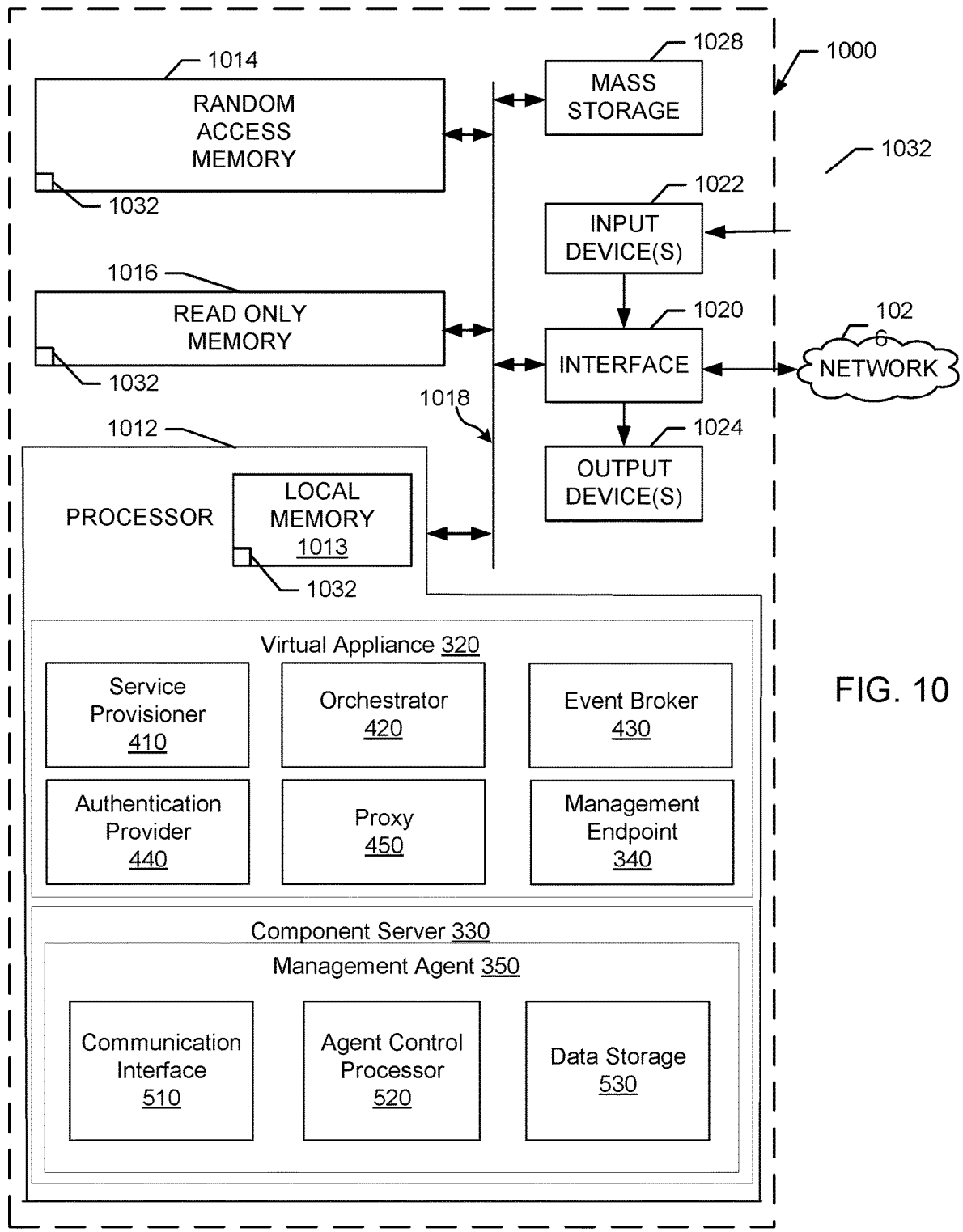
FIG. 10 is a block diagram of an example processing platform capable of executing the example machine-readable instructions of FIGS. 8-9.

FIG. 10 is a block diagram of an example processor platform 1000 capable of executing the instructions of FIGS. 8-9 to implement the example systems, operation, and management of FIGS. 1-7. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example systems 100, 300 or portions thereof, such as the vA 320-324, component server 330-336, management endpoint 340-344, and management agent 350-356. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026

(e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives.

Coded instructions 1032 representative of the example machine readable instructions of FIGS. 8-9 may be stored in the mass storage device 1028, in the volatile memory 1014, in the non-volatile memory 1016, and/or on a removable tangible computer readable storage medium such as a CD or DVD.

In certain examples, the processor 1012 can be used to implement the virtual appliance 320 (and vAs 322-324) and the component server 330 (and servers 332-336) and their components including the service provisioner 410, orchestrator 420, event broker 430, authentication provider 440, proxy 450, management endpoint 340, management agent 350, communication interface 510, agent control processor 520, data storage 530, etc.

From the foregoing, it will be appreciated that the above disclosed methods, apparatus and articles of manufacture facilitate installation of a virtual appliance and associated component servers as an IaaS in a distributed environment such as a cloud computing environment and management of agents in the distributed environment. Examples disclosed herein facilitate self-evaluation and installation of servers and agents without further user intervention or cloud oversight.

As described above, rather than requiring customers to manually install the IaaS on each component server, the installation of each node can be facilitated from a centralized location via a management endpoint and management agents running on each component server. The management agents are registered with the virtual appliance, and further communication between the agent and the appliance is authenticated using a self-signed certificate. The appliance's root credentials are not persisted on the individual component servers. Each instance of the management agent has a node identifier, which uniquely identifies the node in the cluster of machines forming the infrastructure deployment. After registration, the management agent starts polling the virtual appliance in configurable time for commands to be executed. The commands are executed by the server(s), and the result(s) is/are reported back to the virtual appliance and can be used for further processing.

Certain examples provide an apparatus. The example apparatus includes a first virtual appliance including a management endpoint, the first virtual appliance to organize tasks to be executed to install a computing infrastructure. The example apparatus includes a first component server to execute tasks, the component server including a management agent to communicate with the management endpoint to receive a task to be executed to install the computing infrastructure, the first virtual appliance to associate a role with the first component server and to determine whether the first component server satisfies a prerequisite associated with the role, the first virtual appliance to facilitate addressing an error when the first component server is determined not to satisfy the prerequisite.

In certain examples, the first virtual appliance of the example apparatus is to facilitate addressing the error by at least one of a) automatically fixing the error such that the first component server satisfies the prerequisite or b) facilitating data entry to resolve the error.

In certain examples, the first virtual appliance of the example apparatus is to validate the first component server to confirm resolution of the error.

In certain examples, the first virtual appliance of the example apparatus is to capture a snapshot as a recovery point for installation of the computing infrastructure.

In certain examples, the first virtual appliance of the example apparatus is to facilitate installation of a service on the first component server by deploying the task to the first component server.

In certain examples, the management agent of the first component server of the example apparatus is to poll the management endpoint of the first virtual appliance to request the task.

In certain examples, the first virtual appliance of the example apparatus is to evaluate a dependency associated with the task and evaluate whether an identified dependency is satisfied or unsatisfied, and wherein the first virtual appliance is to deploy the task to the first component server when no unsatisfied dependency is found and is to hold the task when an unsatisfied dependency is found.

Certain examples provide a method. The example method includes deploying, by executing an instruction with a processor, a first virtual appliance, the first virtual appliance including a management endpoint, the first virtual appliance to organize tasks to be executed to install a computing infrastructure. The example method includes installing, by executing an instruction with the processor, a first component server to execute tasks, the component server including a management agent to communicate with the management endpoint. The example method includes associating, by executing an instruction with the processor, the first virtual appliance with a role. The example method includes determining, by executing an instruction with the processor, whether the first component server satisfies a prerequisite associated with the role. The example method includes facilitating, by executing an instruction with the processor, addressing of an error by the first virtual appliance when the first component server is determined not to satisfy the prerequisite.

In certain examples, facilitating addressing of the error includes facilitating addressing of the error by at least one of a) automatically fixing the error such that the first component server satisfies the prerequisite or b) facilitating data entry to resolve the error.

In certain examples, the method further includes validating, by executing an instruction with the processor, the first component server to confirm resolution of the error.

In certain examples, the method further includes capturing, by executing an instruction with the processor, a snapshot as a recovery point for installation of the computing infrastructure.

In certain examples, the method further includes facilitating, by executing an instruction with the processor, installation of a service on the first component server by deploying the task to the first component server.

In certain examples, the method further includes polling, by executing an instruction with the processor, of the management endpoint of the first virtual appliance by the management agent of the first component server to request the task.

In certain examples, the method further includes evaluating, by executing an instruction with the processor, a dependency associated with the task; evaluating, by executing an instruction with the processor, whether an identified dependency is satisfied or unsatisfied; deploying, by executing an instruction with the processor, the task to the first component server when no unsatisfied dependency is found; and holding, by executing an instruction with the processor, the task when an unsatisfied dependency is found.

Certain examples provide a computer readable storage medium including instructions that, when executed, cause a machine to at least: deploy a first virtual appliance, the first virtual appliance including a management endpoint, the first virtual appliance to organize tasks to be executed to install a computing infrastructure; install a first component server to execute tasks, the component server including a management agent to communicate with the management endpoint; associate the first virtual appliance with a role; determine whether the first component server satisfies a prerequisite associated with the role; and facilitate addressing of an error by the first virtual appliance when the first component server is determined not to satisfy the prerequisite.

In certain examples, the instructions, when executed, cause the machine to facilitate addressing of the error including facilitating addressing of the error by at least one of a) automatically fixing the error such that the first component server satisfies the prerequisite or b) facilitating data entry to resolve the error.

In certain examples, the instructions, when executed, further cause the machine to validate the first component server to confirm resolution of the error.

In certain examples, the instructions, when executed, further cause the machine to facilitate installation of a service on the first component server by deploying the task to the first component server.

In certain examples, the instructions, when executed, further cause the machine to facilitate polling of the management endpoint of the first virtual appliance by the management agent of the first component server to request the task.

In certain examples, the instructions, when executed, further cause the machine to: evaluate a dependency associated with the task; evaluate whether an identified dependency is satisfied or unsatisfied; deploy the task to the first component server when no unsatisfied dependency is found; and hold the task when an unsatisfied dependency is found.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   at least one processor to implement:
      a virtual appliance including a management endpoint, the virtual appliance to organize tasks in a queue to be executed to install a computing infrastructure; and
      a component server to execute tasks, the component server including a management agent to communicate with the management endpoint to receive a first task from the queue to be executed to install the computing infrastructure, the queue including at least the first task and a second task to be executed by the component server, the virtual appliance to associate a role with the component server and to determine whether the component server satisfies a prerequisite associated with the role, the virtual appliance to remedy an error identified by the virtual appliance when the component server is determined not to satisfy the prerequisite, the virtual appliance to adjust a configuration of the component server to remedy the error and satisfy the prerequisite associated with the role to execute the first task,
   wherein the management agent is to poll the management endpoint to trigger the management endpoint of the virtual appliance to evaluate whether a dependency associated with the first task is satisfied or unsatisfied, and wherein the virtual appliance is to, when no unsatisfied dependency is found, deploy the first task from the queue to the component server for execution and is to, when an unsatisfied dependency is found, deploy the second task to the component server for execution, the second task having no unsatisfied dependency, and hold deployment and execution of the first task until the management endpoint determines that the unsatisfied dependency becomes satisfied.

2. The apparatus of claim 1, wherein, when the error is identified by the virtual appliance but not remedied, the virtual appliance is to facilitate data entry to resolve the error.

3. The apparatus of claim 2, wherein the virtual appliance is to validate the component server to confirm resolution of the error.

4. The apparatus of claim 1, wherein the virtual appliance is to capture a snapshot as a recovery point for installation of the computing infrastructure.

5. The apparatus of claim 1, wherein the virtual appliance is to facilitate installation of a service on the component server by deploying the first task to the component server.

6. The apparatus of claim 5, wherein the management agent of the component server is to poll the management endpoint of the virtual appliance to request the first task.

7. A method comprising:
   deploying, by executing an instruction with a processor, a virtual appliance, the virtual appliance including a management endpoint, the virtual appliance to organize tasks in a queue to be executed to install a computing infrastructure, the queue including at least a first task and a second task;
   installing, by executing an instruction with the processor, a component server to execute tasks, the component server including a management agent to communicate with the management endpoint;
   associating, by executing an instruction with the processor, the component server with a role;
   determining, by executing an instruction with the processor, whether the component server satisfies a prerequisite associated with the role;
   when the component server is determined not to satisfy the prerequisite, identifying an error;
   remedying, by executing an instruction with the processor when the component server is determined not to satisfy the prerequisite, the error by adjusting a configuration of the component server to satisfy the prerequisite associated with the role to execute the first task received from the queue;
   evaluating, by executing an instruction with the processor based on a poll of the management endpoint by the management agent, whether a dependency associated with the first task is satisfied or unsatisfied;
   when no unsatisfied dependency is found, deploying, by executing an instruction with the processor, the first task from the queue to the component server for execution; and when an unsatisfied dependency is found, deploying the second task to the component server for execution, the second task having no unsatisfied dependency, and holding, by executing an instruction with the processor, deployment and execution of the first task until the management endpoint determines that the unsatisfied dependency becomes satisfied.

8. The method of claim 7, wherein, when the error is identified but not remedied, facilitating data entry to resolve the error.

9. The method of claim 8, further including validating, by executing an instruction with the processor, the component server to confirm resolution of the error.

10. The method of claim 7, further including capturing, by executing an instruction with the processor, a snapshot as a recovery point for installation of the computing infrastructure.

11. The method of claim 7, further including facilitating, by executing an instruction with the processor, installation of a service on the component server by deploying the first task to the component server.

12. The method of claim 11, further including polling, by executing an instruction with the processor, of the management endpoint of the virtual appliance by the management agent of the component server to request the first task.

13. A computer readable storage medium comprising instructions that, when executed, cause a machine to at least:
deploy a virtual appliance, the virtual appliance including a management endpoint, the virtual appliance to organize tasks in a queue to be executed to install a computing infrastructure, the queue including at least a first task and a second task;
install a component server to execute tasks, the component server including a management agent to communicate with the management endpoint;
associate the component server with a role;
determine, based on a poll of the management endpoint by the management agent, whether the component server satisfies a prerequisite associated with the role;
when the component server is determined not to satisfy the prerequisite, identify an error;
when the component server is determined not to satisfy the prerequisite, remedy the error by adjusting a configuration of the component server to satisfy the prerequisite associated with the role to execute the first task received from the queue;
evaluate whether a dependency associated with the first task is satisfied or unsatisfied;
when no unsatisfied dependency is found, deploy the first task from the queue to the component server for execution; and
when an unsatisfied dependency is found, deploy the second task to the component server for execution, the second task having no unsatisfied dependency, and hold deployment and execution of the first task until the management endpoint determines that the unsatisfied dependency becomes satisfied.

14. The storage medium of claim 13, wherein, when the error is identified by the virtual appliance but not remedied, the instructions, when executed, cause the machine to facilitate data entry to resolve the error.

15. The storage medium of claim 14, wherein the instructions, when executed, further cause the machine to validate the component server to confirm resolution of the error.

16. The storage medium of claim 13, wherein the instructions, when executed, further cause the machine to facilitate installation of a service on the component server by deploying the first task to the component server.

17. The storage medium of claim 16, wherein the instructions, when executed, further cause the machine to facilitate polling of the management endpoint of the virtual appliance by the management agent of the component server to request the first task.

18. The apparatus of claim 1, wherein the queue further includes a third task, the third task dependent on the first task, wherein the virtual appliance is to hold the third task until the first task is complete.

19. The apparatus of claim 18, wherein the component server is a first component server, and wherein the first task and the second task are to be executed by the first component server, the third task to be executed by a second component server.

20. The apparatus of claim 1, wherein the management endpoint is a first management endpoint, and wherein the management agent is to poll a second management endpoint to deploy the first task when the first management endpoint is unresponsive.

* * * * *